(12) United States Patent
Yarbrough et al.

(10) Patent No.: US 10,885,510 B2
(45) Date of Patent: Jan. 5, 2021

(54) FACILITATING PAYMENTS USING WEARABLE DEVICES

(71) Applicant: PayPal, Inc., San Jose, CA (US)

(72) Inventors: Joel P. Yarbrough, Oakland, CA (US); Richard Joseph Mercille, San Jose, CA (US); William RaDue Clarke, San Jose, CA (US); Priyadarshini Rajendran, Los Altos, CA (US); George Michael Kurtyka, San Francisco, CA (US); Valerie Chun, Palo Alto, CA (US)

(73) Assignee: PAYPAL, INC., San Jose, CA (US)

( * ) Notice: Subject to any disclaimer, the term of this patent is extended or adjusted under 35 U.S.C. 154(b) by 637 days.

(21) Appl. No.: 14/586,932

(22) Filed: Dec. 30, 2014

(65) Prior Publication Data
US 2015/0242837 A1 Aug. 27, 2015

Related U.S. Application Data

(60) Provisional application No. 61/943,268, filed on Feb. 21, 2014, provisional application No. 61/978,695, filed on Apr. 11, 2014.

(51) Int. Cl.
*G06Q 20/40* (2012.01)
*G06Q 20/32* (2012.01)

(52) U.S. Cl.
CPC ........ *G06Q 20/327* (2013.01); *G06Q 20/322* (2013.01); *G06Q 20/40* (2013.01); *G06Q 20/40145* (2013.01)

(58) Field of Classification Search
USPC .................................................. 705/35–44
See application file for complete search history.

(56) References Cited

U.S. PATENT DOCUMENTS 7,477,890 B1 * 1/2009 Narayanaswami ......................... H04W 12/0808 455/414.1
9,100,493 B1 * 8/2015 Zhou ................. H04M 1/72522
(Continued)

OTHER PUBLICATIONS

EBay Inc.; Patent Issued for Location-Based Services by Internet Weekly News; Atlanta [Atlanta]Dec. 17, 2012: 18. https://search.proquest.com/docview/1237188447/abstract/EA071210D41422DPQ/13?accountid=14753 (Year: 2012).*
(Continued)

*Primary Examiner* — Hani M Kazimi
*Assistant Examiner* — Hatem M Ali
(74) *Attorney, Agent, or Firm* — Haynes and Boone, LLP

(57) ABSTRACT

A wearable device, e.g., a smart watch, may be connected to a communication device, such as a mobile smart phone, via Bluetooth or other Near Field Communication (NFC). In particular, the wearable device may have a touch screen that may serve as an extended display and/or user input device of the communication device. For example, a user may receive payment related notifications on the wearable device. The user also may operate the wearable device to make and/or receive payments, view transaction history, view and/or accept offers from nearby merchants, view and/or check in to nearby stores and etc. Further, the wearable device also may allow the user to make payment transactions in extreme environments not suitable for the communication device, such as under water.

20 Claims, 12 Drawing Sheets

(56) References Cited

U.S. PATENT DOCUMENTS

| | | | |
|---|---|---|---|
| 2007/0197261 A1 | 8/2007 | Humbel | |
| 2010/0274678 A1 | 10/2010 | Rolf et al. | |
| 2011/0105022 A1 | 5/2011 | Vawter | |
| 2012/0116918 A1* | 5/2012 | Andersson | G06Q 20/02 705/26.41 |
| 2013/0146659 A1* | 6/2013 | Zhou | G06Q 20/40145 235/380 |
| 2013/0173461 A1* | 7/2013 | Levy | G06Q 10/10 705/39 |
| 2013/0246260 A1 | 9/2013 | Barten et al. | |
| 2014/0308930 A1* | 10/2014 | Tran | H04W 4/18 455/414.1 |
| 2015/0242837 A1* | 8/2015 | Yarbrough | G06Q 20/327 705/44 |
| 2015/0294303 A1* | 10/2015 | Hanson | G06K 19/0723 235/379 |

OTHER PUBLICATIONS

Analysis of Social Interactions Through Mobile Phones by Matic, Aleksandar; Osmani, Venet; Mayora-ibarra, Oscar. Mobile Networks and Applications; New York vol. 17, lss. 6, (Dec. 2012): https://search.proquest.com/docview/1151456357/ EA071210D41422DPQ/27?accountid=14753 (Year: 2012).*

Ubiquitous Monitoring of Electrical Household Appliance by Macías, Elsa; Suarez, Alvaro; Lacuesta, Raquel. Sensors; Basel vol. 12, lss. 11, (2012): 15159-15191; https://search.proquest.com/docview/ 1537538375/EA071210D41422DPQ/49?accountid=14753 (Year: 2012).*

* cited by examiner

FACILITATING PAYMENTS USING WEARABLE DEVICES

CROSS REFERENCE TO RELATED APPLICATION

Pursuant to 35 U.S.C. § 119(e), this application claims priority to the filing dates of U.S. Provisional Patent Application Ser. No. 61/943,268, filed Feb. 21, 2014 and U.S. Provisional Patent Application Ser. No. 61/978,695, filed Apr. 11, 2014, both of which are incorporated by reference in their entirety.

BACKGROUND

Field of the Invention

The present invention generally relates to systems and methods for facilitating payments using wearable devices.

Related Art

In today's internet commerce, many payment transactions are made online via the internet. For example, a user may use a mobile device to make purchases and facilitate payments. Mobile devices may be connected to a wearable device, such as a smart watch. When the mobile device is connected to the peripheral device, the user may have access to the wearable device but not the mobile device itself. When the user wishes to make an online payment using the mobile device, the user has to find and bring out the mobile device, which is inconvenient to the user. Therefore, there is a need for a system or method that allows the user to facilitate payments using the wearable device.

Figure 1:
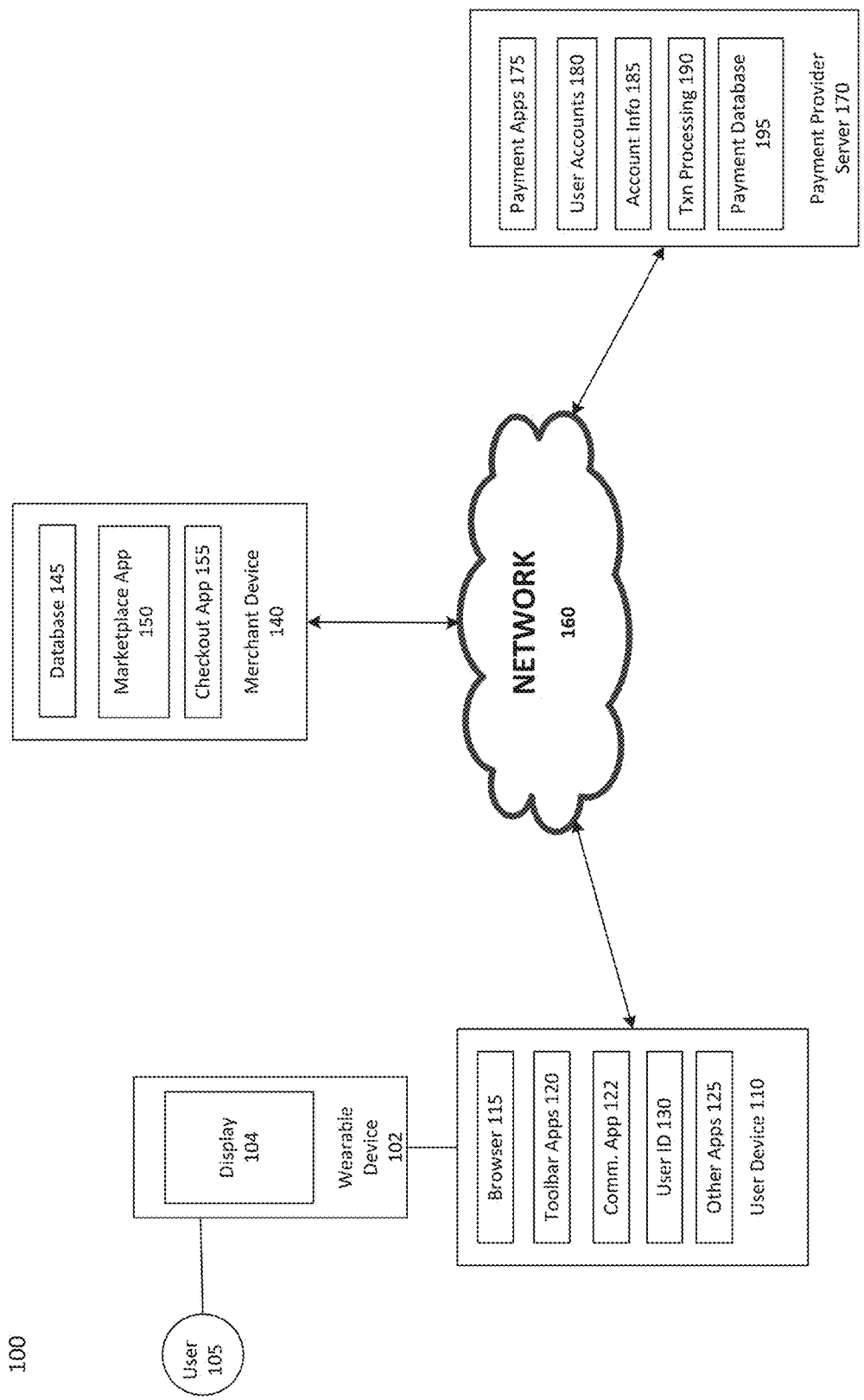
FIG. 1 is a block diagram of a networked system suitable for facilitating payments using wearable devices according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a wearable device, e.g., a smart watch, may be connected to a communication device, such as a mobile smart phone, via Bluetooth or other Near Field Communication (NFC). In particular, the wearable device may have a touch screen that may serve as an extended display and/or user input device of the communication device. For example, a user may receive payment related notifications on the wearable device. The user also may operate the wearable device to make and/or receive payments, view transaction history, view and/or accept offers from nearby merchants, view and/or check in to nearby stores, etc. Further, the wearable device also may allow the user to make payment transactions in extreme environments may not be suitable for the communication device, such as under water.

In an embodiment, a system or a method may be provided to implement an application framework that allows a communication device to manage and implement a plurality of different wearable devices. In particular, a payment application installed on the communication device may implement notifications and information display on various wearable devices. Further, the payment application also may receive and implement user instructions entered via the various wearable devices.

In an embodiment, a system or a method is provided to implement quick access to transaction information for high-velocity online market sellers, such as eBay, Inc. Further, data transmission between the wearable device and the communication device may be encrypted to provide additional security. A login process may be implemented to link the wearable device to the communication device. The user may login at least daily on the communication device to renew the linking session between the wearable device and the communication device. The user may extend the linking session based on notifications displayed on the wearable device. When the wearable device and the communication device are linked, various functions may be available to the user via the wearable device. User preferences and data may be stored by the payment application with the payment service provider.

In an embodiment, when the linking session remains active, the user may check in to various merchants or locations via the wearable device. Various functions, such as viewing offers, saving coupons and other incentives to a wallet, storing lists and other low risk activities, may be implemented via the wearable device. Other activities that require additional security may be redirected to the communication device where the user may implement or perform these activities that require additional security. In an embodiment, the user may automatically be checked into a location or a merchant based on the user's prior consent.

In an embodiment, the payment service provider may track various wearable devices linked to the user's payment account. As such, the user may manage various wearable devices that interact with the user's payment account. In another embodiment, the payment service provider may track payments and/or check-ins that are implemented via wearable devices. In particular, a subset of transactions implemented via wearable devices may be tracked.

In an embodiment, the user may designate favorite places with a heart symbol or other visual indicator. The user may automatically be checked into favorite places. In an embodiment, vibration alerts may be used on the wearable device. For example, the wearable device may vibrate when a large amount of information is sent or received, when the user is checked into a new place, or when other beacon related events occur. In an embodiment, the wearable device may receive voice commands. For example, voice commands like "order," "send money," or "request money" may be received at the wearable device. Other basic voice actions, such as "check in to Jamba Juice," or "find a coupon for coffee," also may be received at the wearable device.

In another embodiment, voice control also may be used for user authentication. For example, a confidence level may be determined based on whether the user speaking is the same one linked to the device. Other advanced voice actions involving Risk and Platform tools also may be implemented, such as "send $5 to Gerald." In an embodiment, the wearable device may have camera access that may be used to scan product bar codes from which price comparisons may be implemented.

In an embodiment, biometrics detected at the wearable device may be used for user authentication. For example, accelerometer or heart rate sensors on the wearable device may collect data from the user and share data with the communication device. This data may be used to authenticate the user. Other biometric data, such as voiceprint may be captured and used for confidence scoring during authentication. One or more fingerprint sensors also may be used to collect fingerprints of the user for authentication.

FIG. 1 is a block diagram of a networked system 100 suitable for implementing a process for facilitating purchases using peripheral devices according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a wearable device 102, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. User 105 may input instructions for making a purchase to user device 110 via wearable device 102. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

User device 110, wearable device 102, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable computing device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a digital wallet or account through the payment provider as discussed herein. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

Wearable device 102 may be connected to (e.g., in electronic communication with) user device 110. Wearable device 102 may be a display device, such as a smart watch. Wearable device 102 may include a display 104. Wearable device 102 may be connected to user device 110 by wire or wirelessly. For example, wearable device 102 may be connected to user device 110 via Bluetooth or other NFC. Bluetooth or NFC signals may be communicated between user device 110 and wearable device 102. For example, wearable device 102 may be paired wirelessly with user device 110 to establish wireless communication. Display information signals and/or control signals may be communicated wirelessly between wearable device 102 and user device 110. Control or display information signals may be communicated between the wearable device 102 and user device 110 via Bluetooth or other NFC.

Wearable device 102 may include a touch screen display 104. Display 104 may display information sent from user device 110. User operations and inputs on display 104 may be sent from wearable device 102 to user device 110. For example, user 105 may press or swipe on display 104 to navigate among different pages of information or functions displayed on display 104. In an embodiment, physical buttons may be provided on wearable device 102 to receive user 105's input to operate wearable device 102. Wearable device 102 may be waterproof, such that user 105 may operate wearable device 102 under water. Thus, user 105 may use wearable device 102 to indirectly implement various functions of user device 110, such as making/receiving payments, when user 105 is wearing wearable device 102 under water or in other conditions not suitable for user device 110.

Wearable device 102 may include various sensors, such as microphones, temperature sensors, accelerometers, finger scanners, and the like. The various sensors may collect various biometric information of the user, such as heart rate, voice pattern, speech pattern, finger print, touch pattern, and the like. The various biometric information may be used to identify or authenticate the user. For example, the various biometric information may be collected and catalogued at the payment provider server 170 and may be used to authenticate user at another device or at other contexts, such as for comparison with current captured biometric information.

Wearable device 102 also may include a camera or scanner configured to scan or capture images. For example, the wearable device 102 may scan a bar code or a Quick Response (QR) code of a product from which the product may be identified and price comparison may be performed. Wearable device 102 also may include a microphone configured to capture the user's voice commands. The voice commands may be used to implement and control the payment application installed at user device 110. For example, various payment related actions, such as "order," "send money," "request money," "check in to merchant," "find a coupon for coffee," "send $5 to XX," may be initiated by voice command captured at the wearable device 102.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to a charity or a deposit to a saving account. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, and the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

Figure 2:
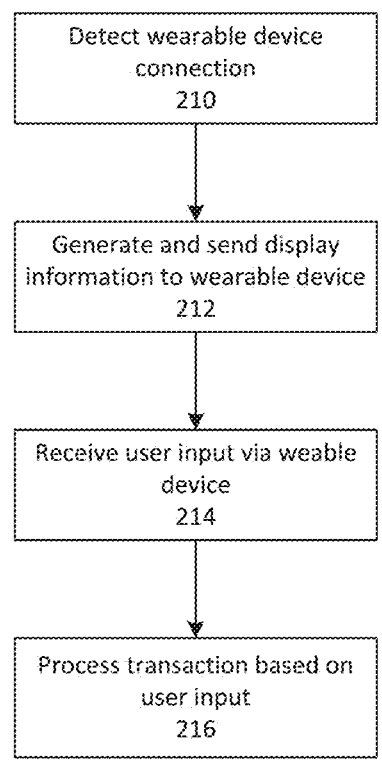
FIG. 2 is a flowchart showing a process for facilitating payments using a wearable device according to one embodiment.

FIG. 2 is a flowchart showing a process 200 for facilitating payments using a wearable device 102 according to one embodiment. At step 202, user device 110 may detect a connection of wearable device 102. User device 110 may connect wirelessly to wearable device 102 via Bluetooth or NFC. For example, user device 110 may detect a wireless request from wearable device 102 to register or setup a wireless connection with wearable device 102. For Bluetooth peripheral devices, user device 110 may perform a wireless pairing process with the Bluetooth peripheral devices to establish wireless Bluetooth connections. In one embodiment, user device 110 may connect to multiple wireless peripheral devices simultaneously. For example, user device 110 may connect to a Bluetooth earpiece and a stereo system of a car simultaneously.

At step 212, user device 110 may generate and send display information to wearable device 102 to be displayed on wearable device 102. In an embodiment, the display information may be generated by the payment service provider at payment provider server 170 and forwarded to wearable device 102 via user device 110. The display information may include notifications, offers from various merchants, transaction information, controls to be operated by user 105, and the like. For example, the display information may include payment notifications indicating that user 105 has been paid, transaction history showing user 105's previous transactions received or sent, offers from merchants, payment account information, and the like.

At step 214, user device 110 or payment provider server 170 may receive user's operations and input at wearable device 102. For example, buttons (physical or virtual) may be displayed on a touch screen of display 104 to be operated by user 105. User 105 may confirm payments, send/receive payments, navigate among different pages of display, and the like, such as by operating various buttons. In an embodiment, physical buttons may be provided on wearable device 102 to receive instructions and input from user 105.

At step 216, user device 110 or payment provider server 170 may process transactions or other functions based on user's input at wearable device 102. For example, user 105 may operate wearable device 102 to make/receive payments, view transactions, offers, nearby merchants, check-in to stores, and the like.

Figure 3:
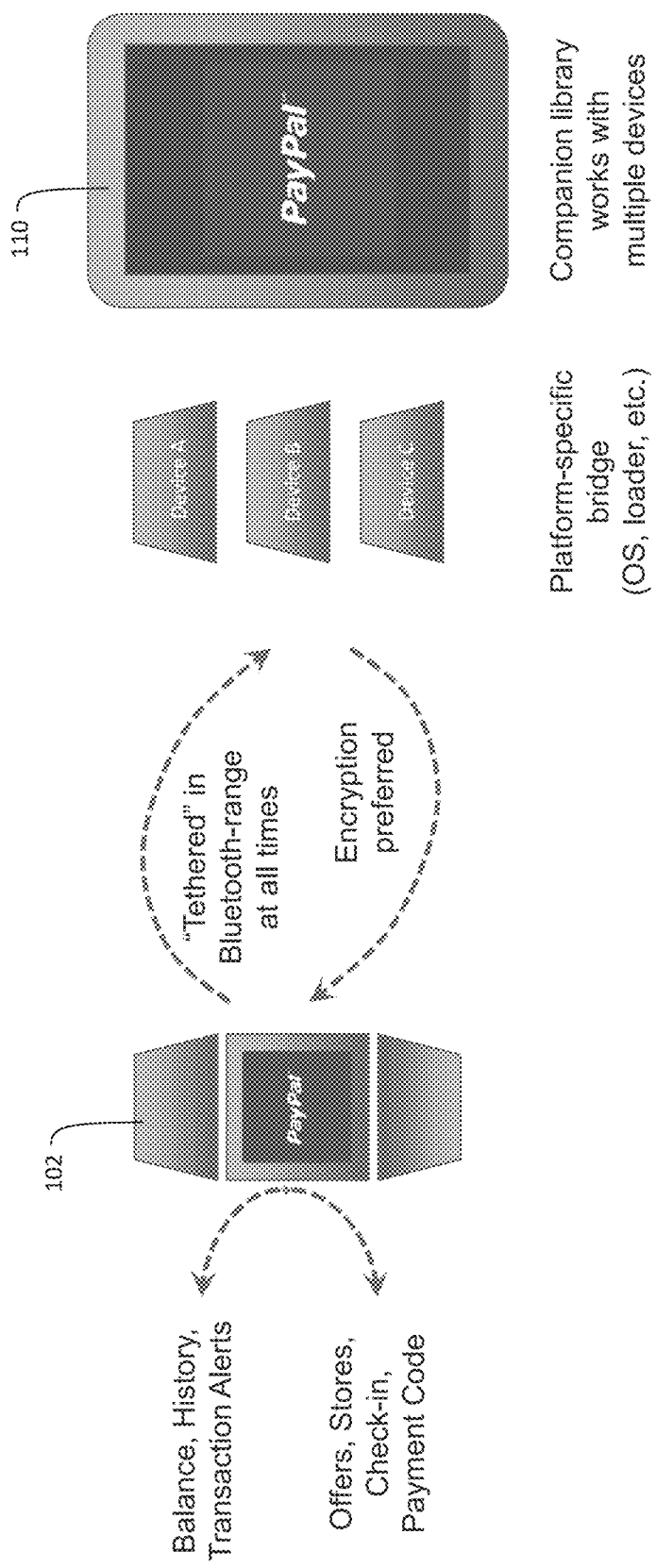
FIG. 3 is a block diagram illustrating interaction between a wearable device and a mobile device according to one embodiment.

FIG. 3 is a diagram illustrating interactions between a wearable device 102 and a user device 110 according to an embodiment. The user device 110 may be a mobile cellular phone, a tablet computer, a laptop computer, or any computing device capable of communicating via wireless communication, such as Bluetooth communication, Near Field Communication (NFC), or low energy Bluetooth communication (BLE). In particular, a payment application, such as a PayPal wearable application may be installed in user device 110 to manage and facilitate communication with various wearable devices. The payment application may include communication modules for various platforms or formats, such as platform specific bridges, for communicating with wearable devices with various operating systems. The various wearable devices may include smart watches, smart glasses, user interface in automobiles, or any devices capable of receiving and displaying information.

The wearable device 102 may be connected to the user device 110 wirelessly. User device 110 may determine the platform or format compatible to the wearable device 102 and may generate and format information accordingly to be displayed at the wearable device 102. In an embodiment, the wearable device 102 may be tethered or linked to the user device 110 automatically when the wearable device 102 is in the proximity of the user device 110 or is in the wireless broadcast range of user device 110. In one embodiment, the range is small, e.g., less than two feet, such that the likelihood of wearable device 102 pairing with a communication device of another user is greatly reduced. This range can be set to a maximum range the user expects between the wearable device and the user device. The communication between the user device 110 and the wearable device 102 may be encrypted for additional security.

Figure 5:
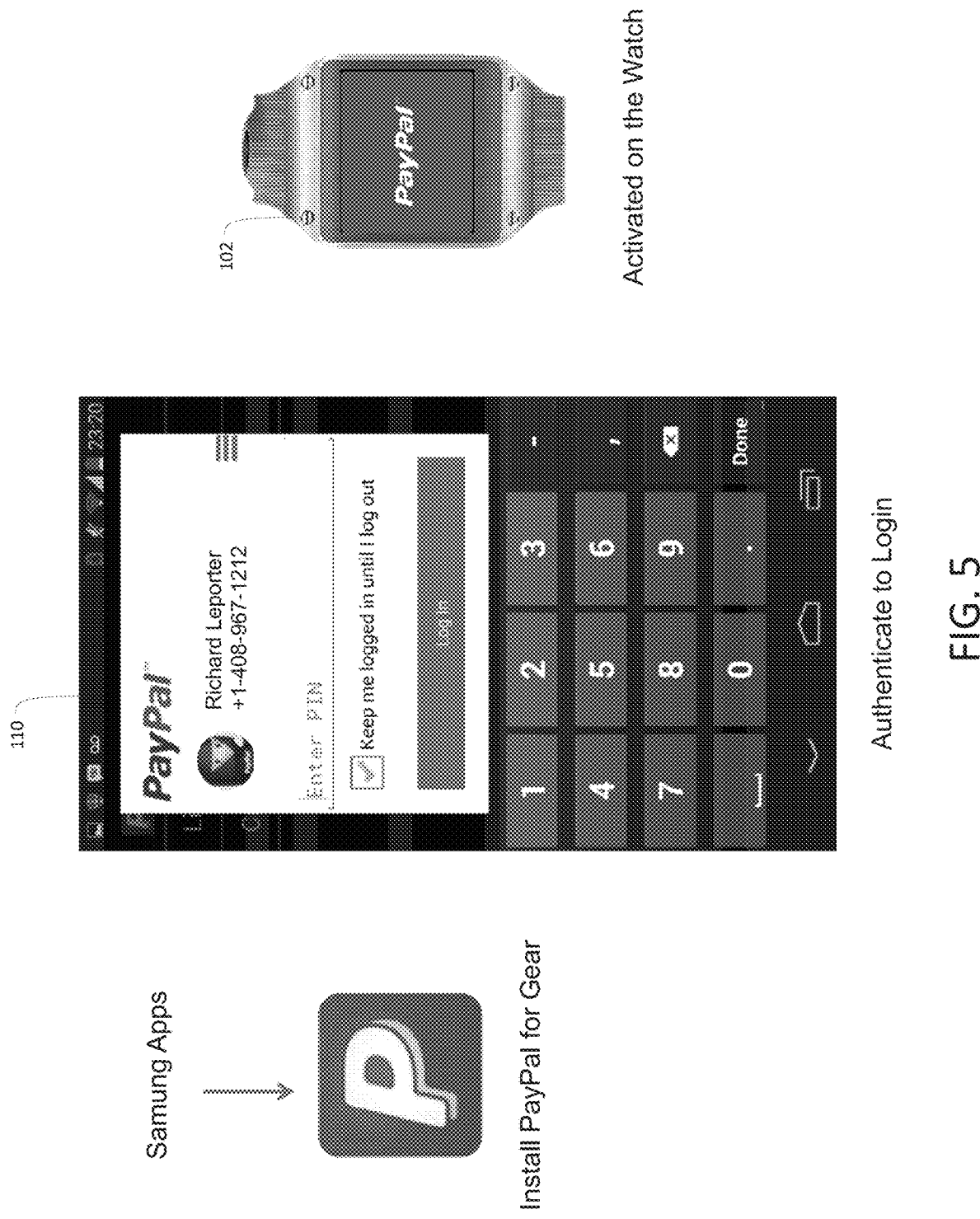
FIG. 5 is a diagram illustrating steps for setting up a wearable device according to one embodiment.

For example, as shown in FIG. 5, a PayPal wearable app may be installed into a mobile cellular phone. The PayPal wearable app may ask the user to link the user device 110 with the wearable device 102 by entering a PIN or password at the user device 110 to authenticate the user 105. Other methods of user authentication, such as by voice recognition, facial recognition, fingerprint scanning, and the like, also may be used to authenticate the user. An option may be provided to allow the wearable device 102 to be continuously linked or logged in with the payment application at the user device 110. The wearable device 102 may display payment related information from the payment application installed at the user device 110 when the wearable device 102 is linked to the user device 110.

After the wearable device 102 is linked with or logged into the payment application at the user device 110, the user may implement various payment related functions via the wearable device 102. For example, information received at the user device 110, such as merchant offers, store check-in notifications, payment codes, or other purchase or payment related to information, may be displayed at the wearable device 102. Further, the user's payment account information, such as account balance, transaction history, transaction alerts, and the like, may be displayed at the wearable device 102.

In some embodiments, the wearable device 102 may be a standalone device operating without the user device 110. As such, the user 105 may operate the wearable device 102 to implement various transactions without the user device 110. For example, the wearable device 102 may incorporate components and functions of the user device 110. Thus, the user 105 may make transactions using the wearable device 102, without the user device 110.

Figure 6:
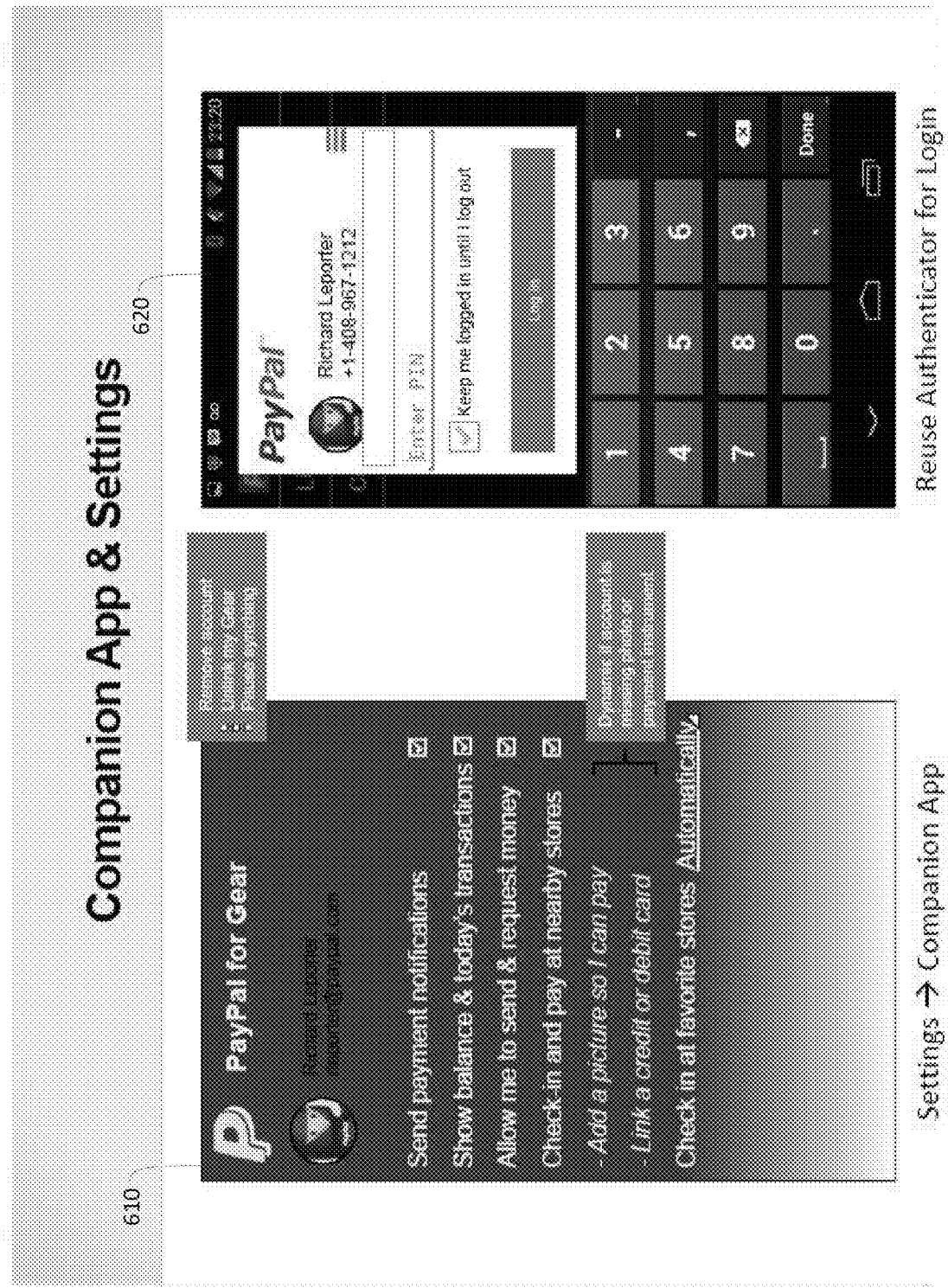
FIG. 6 is a user interface for setting preferences for making payments via a wearable device according to one embodiment.

FIG. 6 illustrates exemplary screen shots of user device 110 for setting up wearable device 102 with user device 110. In particular, user 105 may input different settings for how wearable device 102 interacts with user device 110. For example, user 105 may link user 105's payment account to user device 110 and/or wearable device 102. User 105 also may set up how and when the wearable device 102 is linked to user device 110. In addition, user 105 may set up how and when the wearable device 102 synchronizes with user device 110.

As shown in screen 610, interface may be provided for user 105 to input selections for various settings. For example, user 105 may choose to send payment notifications using wearable device 102. Selections for allowing balance and transactions to be shown on wearable device 102 also may be provided. An option may be provided to allow sending and requesting money or payments using wearable device 102. Another option may be provided to allow check-in and payment at nearby stores. If payment at nearby store is selected, user 105 may be requested to add a picture and/or link a funding source, such as credit card or bank accounts, for payments. Another option may be provided to choose how user 105 may check-in at favorite stores, such as automatically or manually.

As shown in screen 620, an interface is provided to allow user 105 to login to user 105's payment account for payment or other transactions. User 105 is requested to enter a PIN or password and a virtual keypad is displayed to receive user 105's input. User 105 also is allowed to choose to be logged in until user 105 log out. Thus, user interface, such as screen 610 and screen 620, may be provided at user device 110 to allow user 105 to set up how wearable device 102 may be used for facilitating payments and other payment related functions.

Figure 7:
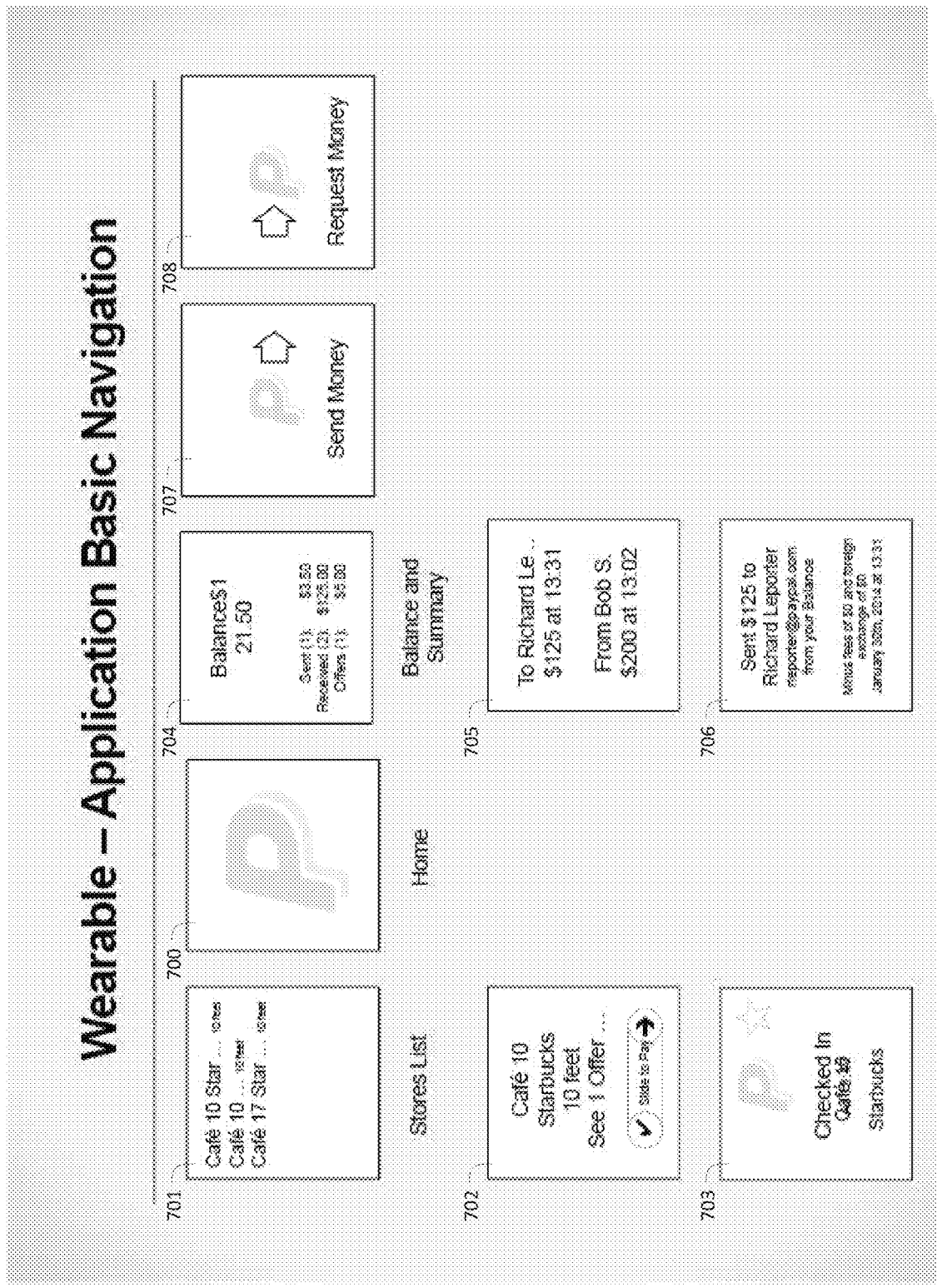
FIG. 7 is a user interface navigation flow chart for a wearable device according to one embodiment.

FIG. 7 is a user interface navigation flow chart for a wearable device according to one embodiment. The information for displaying different screens may be generated at user device 110 or payment provider server 170 and sent to wearable device 102 to be displayed on the display screen 104. Screen 700 may be the home screen displaying a logo of the payment service provider. The home screen may indicate to user 105 that wearable device 102 is now executing a payment application. For example, wearable device 102 may be a smart watch that typically displays time and date. User 105 may perform a gesture on the touch screen of wearable device 102, such as tracing the letter "P" or double tapping, to invoke the payment application on the wearable device 102. User 105's input may be forwarded to user device 110 and/or payment provider server 170 which, in response, may begin to send display information for the payment application to wearable device 102.

From the home screen 700, user 105 may swipe left or right to go to a different function screen. For example, from the home screen 700, user 105 may swipe right to see the store list screen 701. Store list screen 701 may display a list of nearby stores or merchants and their relative distance from user device 110. User device 110 may determine location and position via GPS or other positioning techniques and may search for nearby merchants and stores. The list of merchants and stores may be displayed on wearable device 102. As shown in screen 701, Café 10 Star . . . is 10 feet away.

User 105 may tap on one of the stores or merchants to view more details of the merchant. For example, if user 105 taps on Café 10 Star on screen 701, screen 702 may be displayed to show the name of the merchant "Café 10 Starbucks," the distance of the merchant from user 105 (10 feet), and offers or promotions at the merchant (1 offer). A slider bar also may be provided for user 105 to operate to make payment at this merchant. If user 105 selects a check-in function, a screen 703 may be displayed to indicate that user 105 is located at and checked-in with a merchant. If the merchant is a favorite of user 105, special effects or visual images/graphics, such as a star, may be used to indicate as such. After user 105 is checked into a merchant or a store, user 105 may automatically be signed into user 105's payment account ready to make payments at the checked in location.

From the home screen 700, if user 105 swipes left, a balance and summary screen 704 may be displayed at wearable device 102. The balance and summary screen 504 may display a balance summary of user 105's payment account for a current period. The balance summary may include the current balance ($121.50) and recent transactions, such as payment sent (one transaction of $3.50), payment received (two transactions totaled $125.00), and values of various offers (on offer valued at $5.00). User 105 may swipe up to review details of the transactions on screens 505 and 506. Details of transactions may include sender and/or receiver of transaction, amount of transaction, time and date of transactions, fees, and service provider of the transactions.

Figure 10:
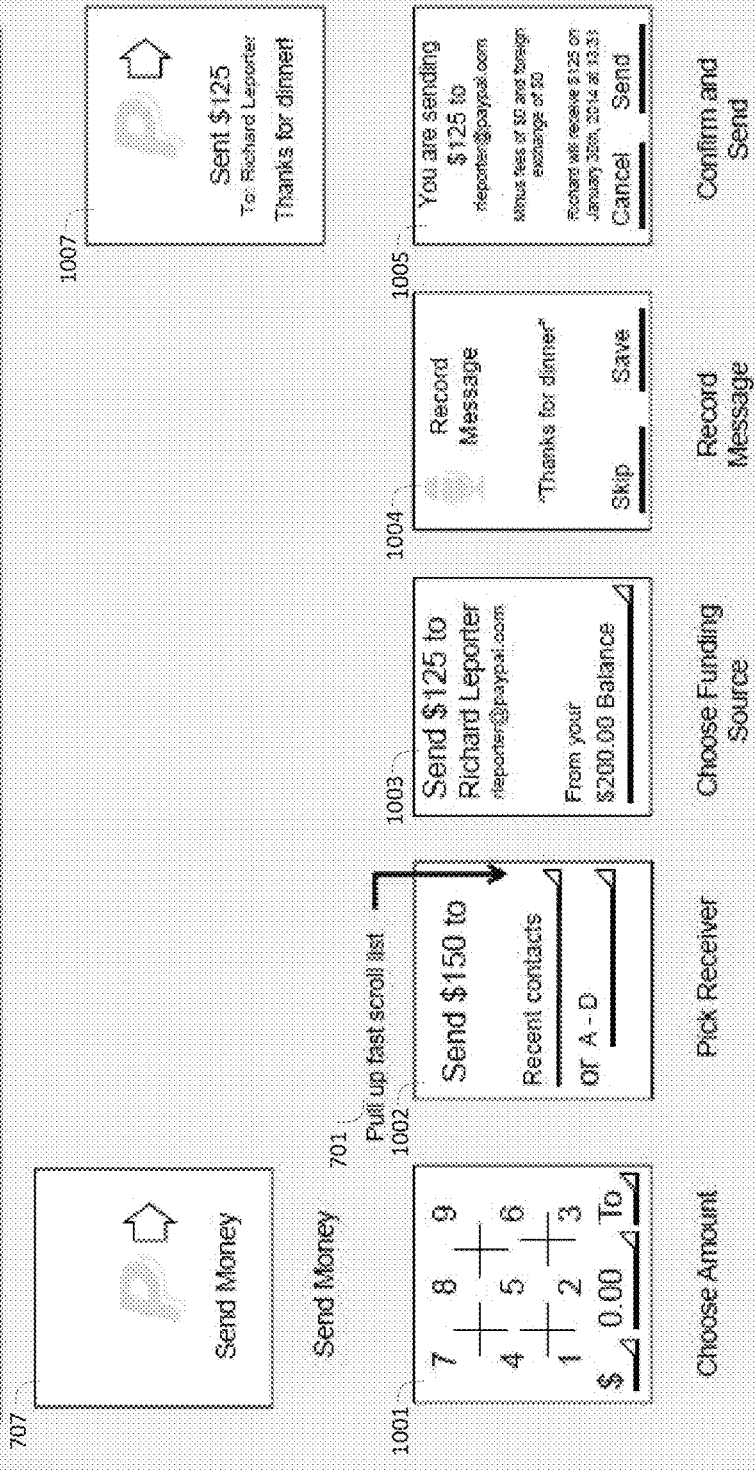
FIG. 10 is a user interface navigation flow chart for a money sending process on a wearable device according to one embodiment.

From the balance and summary screen 704, user 105 may swipe left to show the payment function screen 707 for sending payments or swipe left again to show the payment function screen 708 for receiving payments or requesting money. Referring to FIG. 10, if user 105 selects to send money on screen 707, wearable device 102 may display screen 1001 including a virtual key pad for user 105 to enter the amount of money to be sent. After user 105 enters the amount, screen 1002 may be displayed to allow user 105 to enter the recipient of the payment. The recipient may be selected from user 105's list of contacts on user device 110.

After user 105 enters the recipient, screen 1003 may be displayed to allow user to select the funding source of the payment, such as a bank account, a credit card, or the payment account. After user 105 selects a funding source, screen 1004 may be displayed to allow user to enter a message to be sent along with the payment. User 105 may skip or enter a message. After screen 1004, screen 1005 may be displayed to show a summary of the payment transaction and for user 105 to confirm and send the payment. User 105 may confirm and send or cancel the payment transaction on screen 705. If user 105 confirms and sends the payment, screen 1007 may be displayed to indicate the sending process and the completion of the sending process.

Figure 8:
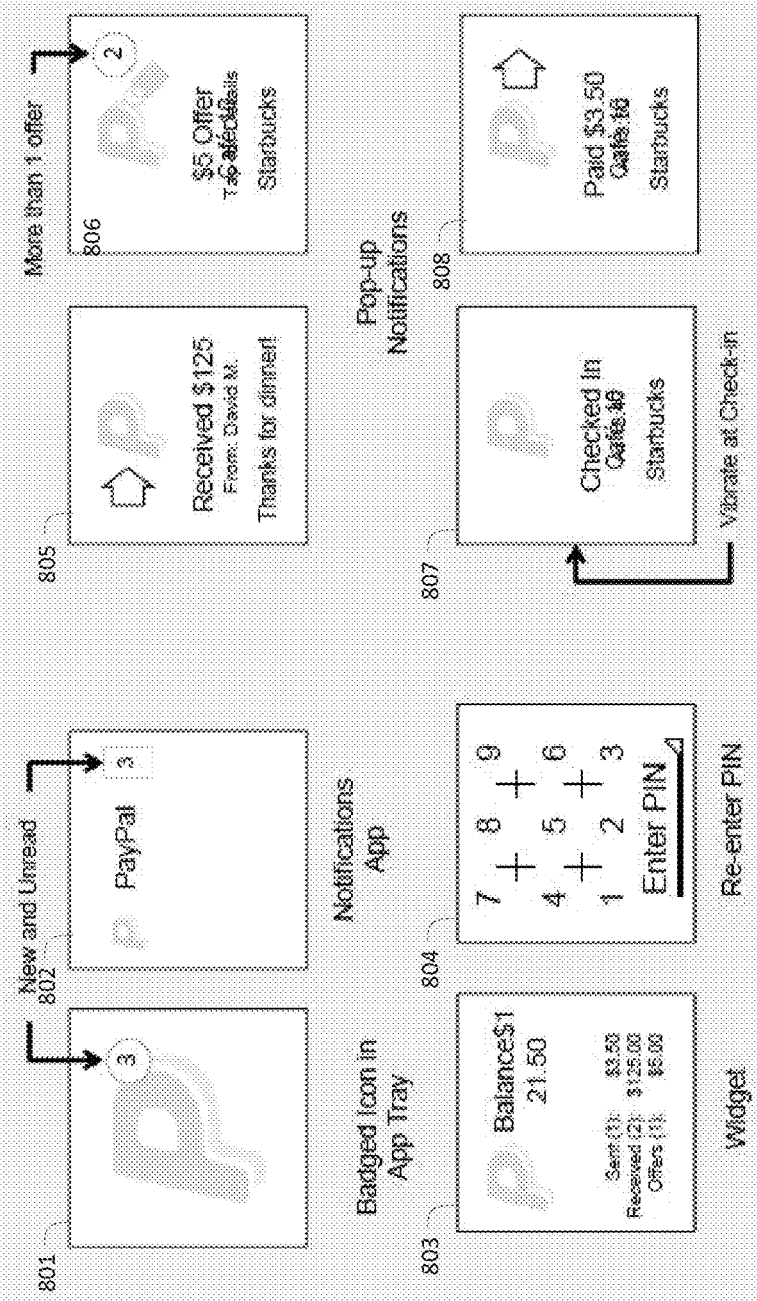
FIG. 8 illustrates various screens for various functions displayed on a wearable device according to one embodiment.

FIG. 8 illustrates various screens for various functions displayed on a wearable device according to one embodiment. As shown on Screens 801 and 802, a number may be displayed along an upper right corner of the logo of the payment service provider to indicate the number of new or unread notifications for user 105. Screen 803 displays an account summary of user 105's payment account including recent transactions. Password or PIN may be required on screen 804 to view other information. Screen 805 displays a notification that user 105 has received $125 from a friend. Screen 806 notifies user 105 of nearby offers including a number of offers displayed at an upper right corner of the screen. Screen 807 notifies that user 105 is checked in at a Starbucks store. Further, wearable device 102 may vibrate to indicate that user 105 is automatically checked in and payment may be made. If payment is made, screen 808 may be displayed to indicate that a payment is made via wearable device 102.

Figure 9:
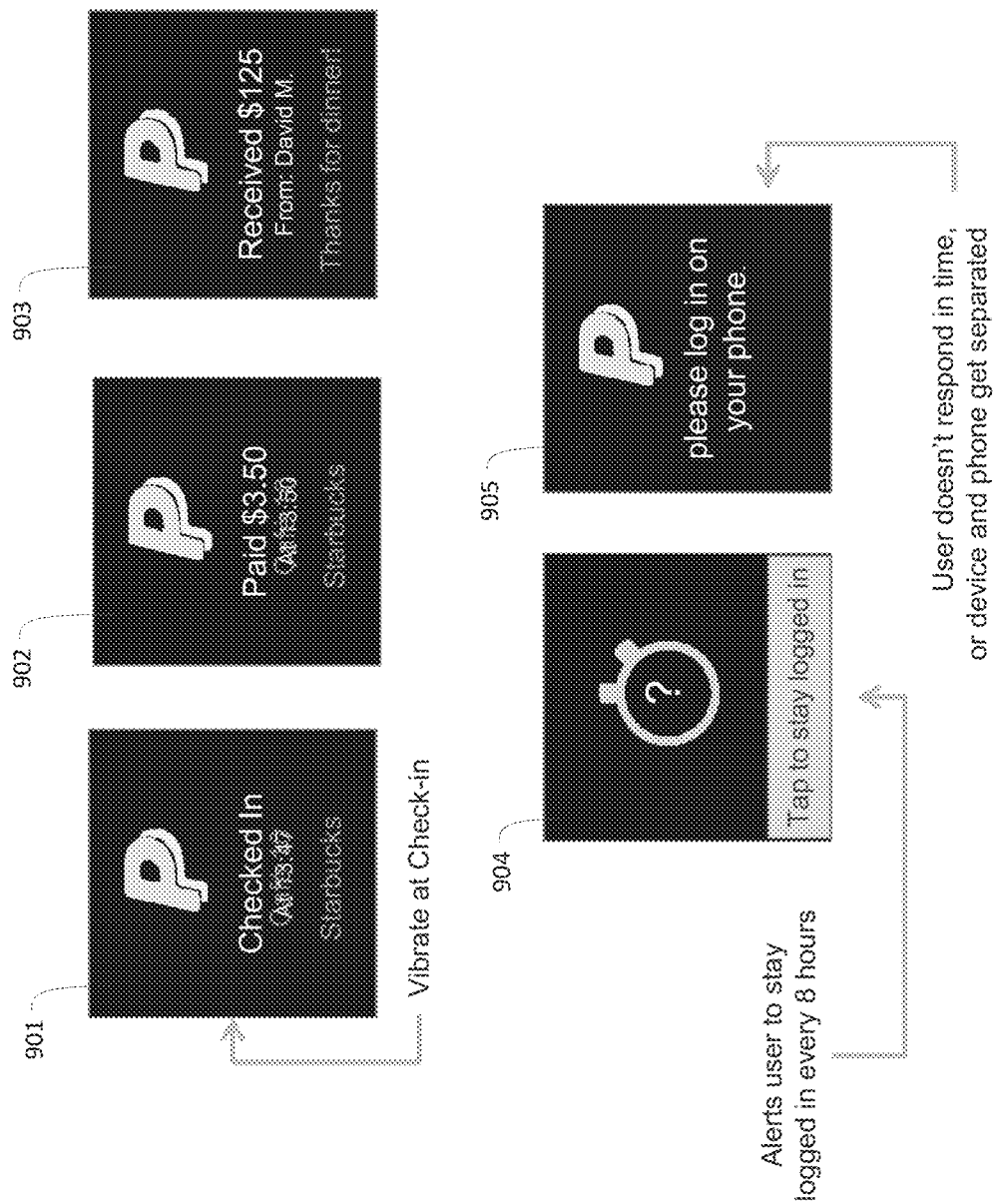
FIG. 9 illustrates various notifications displayed on a wearable device according to one embodiment.

FIG. 9 illustrates various notifications displayed on a wearable device according to one embodiment. Screen 901 may be displayed when the user is checked in at a location or a merchant. For example, when the user enters a Starbucks coffee shop, user device 110 may detect the user's location and may check in at the coffee shop. A notification may be generated and displayed on the wearable device 102, as shown on screen 901. Further, the wearable device 102 may vibrate to alert the user of the check in. This may indicate to the user that the user may make payments at the coffee shop via the wearable device 102.

Screen 902 may be displayed when a payment transaction is made. For example, after purchasing a cup of coffee, the user may pay for the coffee using the wearable device 102. After the payment transaction, a notification may be displayed to indicate that $3.50 has been paid to Starbucks, as shown on screen 702.

Screen 903 may be displayed when a payment has been received by the user. For example, if the user receives money from a friend, the notification may be displayed on the wearable device 102 to indicate that $125 is received from David M. Further, the friend may include a message with the payment to describe the payment, such as "thanks for dinner" indicating that the payment is for their dinner together.

Screen 904 may be displayed when the link between the wearable device 102 and the payment application at user device 110 is about to be disconnected. In particular, the link between wearable device 102 and user device 110 may be maintained for a particular period of time, such as 8 hours. The user is requested to confirm the link every 8 hours to maintain the link. As such, when the 8 hour period is about to expire, screen 704 may be displayed to notify the user and ask the user to tap to stay logged in at the payment application of user device 110. If the user taps the screen, the link between wearable device 102 and the payment application at user device 110 may be maintained for another 8 hours or other time period. If the user does not tap the screen and the time period expires, screen 905 may be displayed to indicate that the user is required to re-establish the link between wearable device 102 and the payment application at user device 110 by logging in at user device 110.

Figure 11:
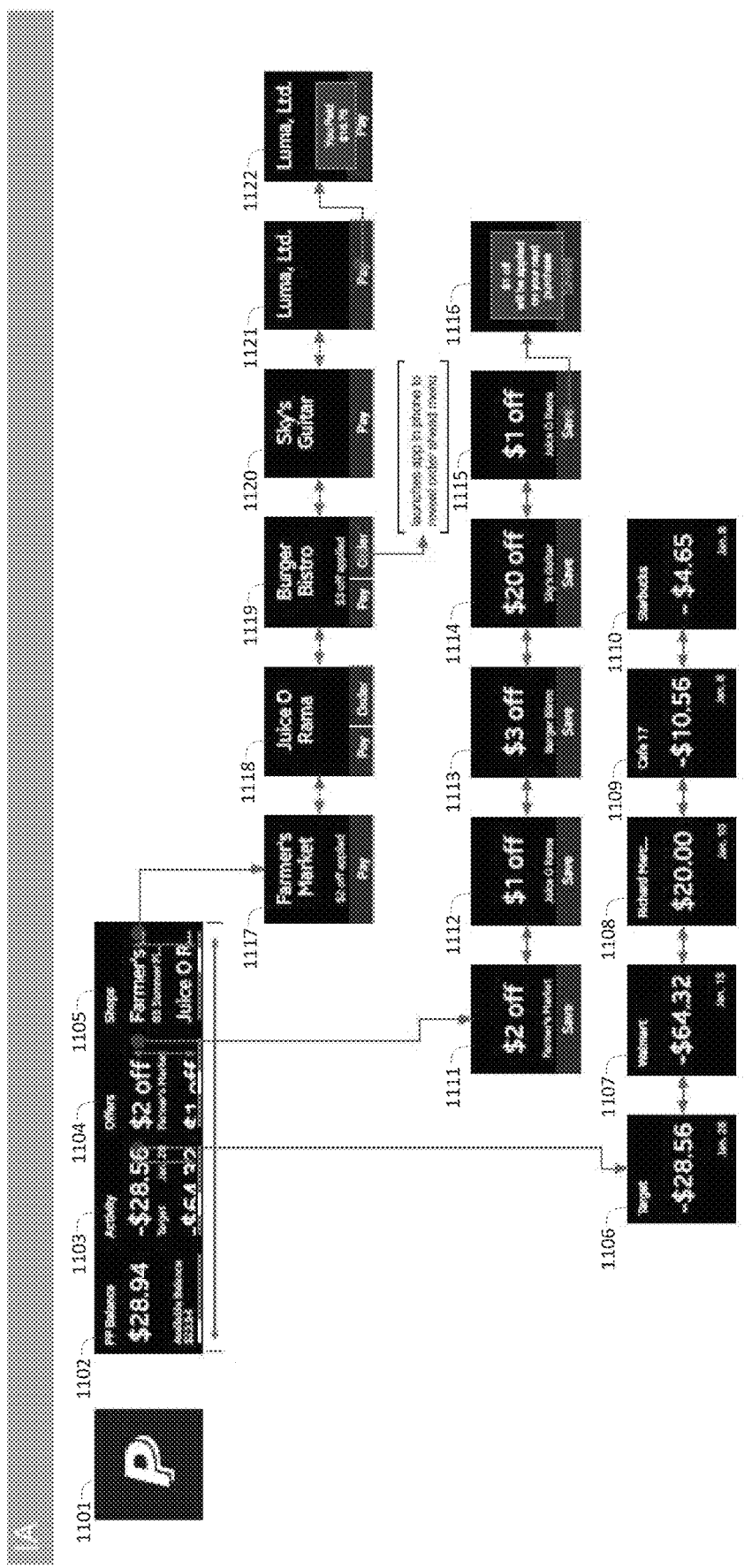
FIG. 11 is a user interface navigation flow chart showing various functions displayed on a wearable device according to one embodiment.

FIG. 11 illustrates a user interface navigation flow chart showing various functions displayed on a wearable device according to one embodiment. Home screen 1101 may display a logo of the payment service provider. If user 105 swipes left, an account summary of user 105 at the payment service provider may be displayed on screen 1102. If user 105 swipes left once more, transaction activities may be displayed on screen 1103. User 105 may scroll down/swipe up to view more transactions displayed on screens 1106-1110 showing various payments at various merchants. For example, payments to merchants, such as Target, Walmart, Café 17, and Starbucks, are shown in negative amounts. Payments received, such as payment received from Richard Marc, are shown in positive amounts.

From screen 1103, if user 105 swipes left, offers from nearby merchants may be displayed at screen 1104. User 105 may scroll down/swipe up to view more offers from various merchants displayed on screen 1111-1116. Each offer is displayed with a save button to allow the user 105 to save an offer for later use. The saved offers may be applied to purchases made by user 105. From screen 1104, if user 105 swipes left, nearby merchants may be displayed on screen 1105. User 105 may scroll down/swipe up to view more merchants located nearby displayed on screens 1117-1122. User 105 may select one or more merchant to make purchases. For example, if the user press a save button on screen 1115 to save the offer "$1 off," a notification may be displayed on screen 1116 indicating that the offer has been saved and will be applied for the next purchase.

A pay button may be provided to make payment to a merchant. If a payment has been made, a notification may be displayed indicating that a certain amount is paid to that merchant. For example, if the use press the pay button in screen 1121 to pay Luma, Ltd. After the payment truncation is completed, a notification is displayed on screen 1122 indicating that the payment has been made. An order button may be provided to order products or services from a merchant. If user presses the order button, an application at user device 110 may be activated to receive product/service selections and orders from user 105.

Figure 12:
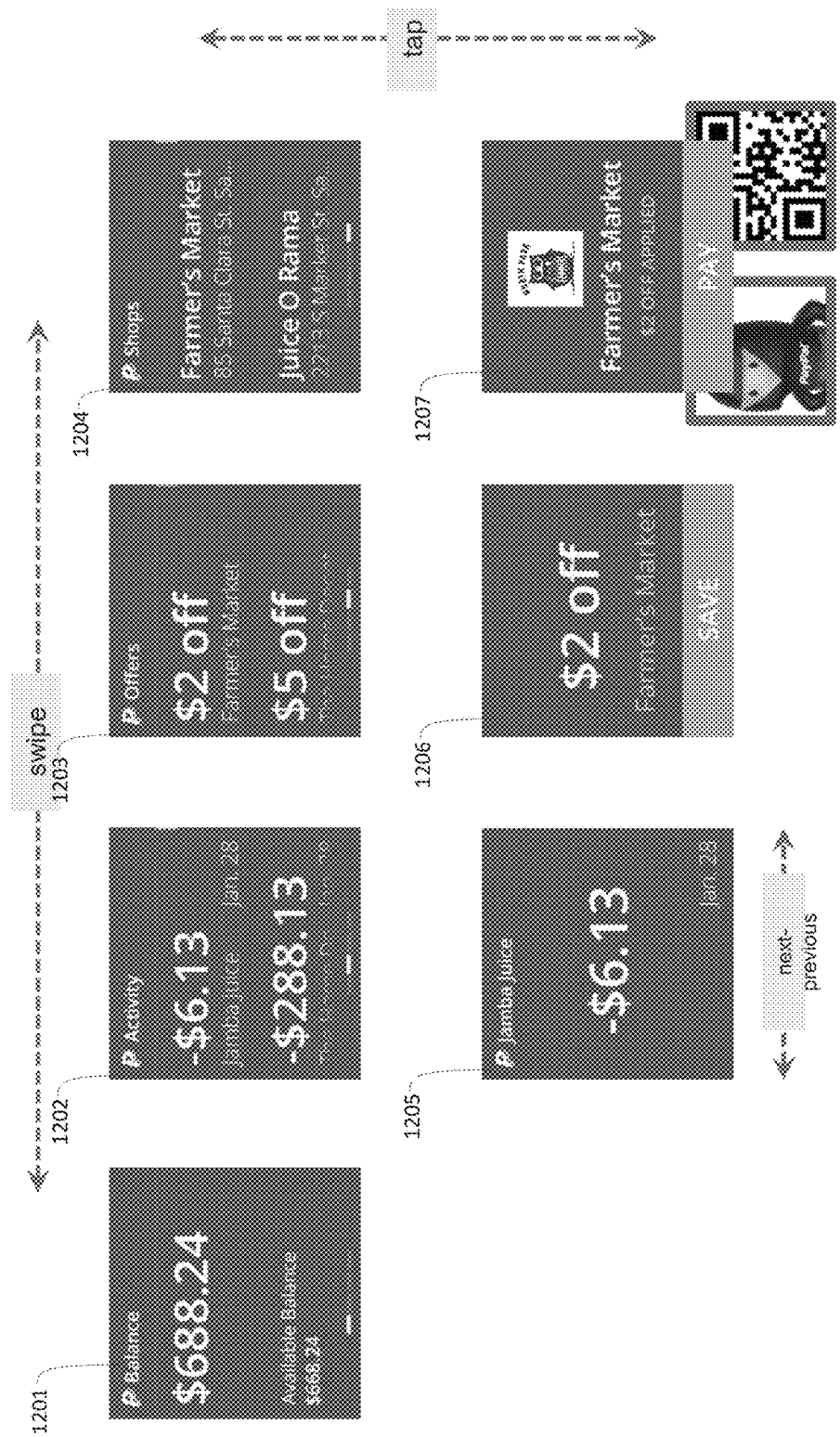
FIG. 12 illustrates various screens for various functions displayed on a wearable device according to one embodiment.

FIG. 12 illustrates various screens for various functions displayed on a wearable device according to one embodiment. For example, screen 1201 may display a balance amount of the user's payment account. The user may swipe left and right on a screen of the wearable device 102 to navigate between different functions or features. The user may navigate among screens 1201-1204 by swiping left or right. Screen 1202 displays a list of transactions recently made via the payment account of the user. The user may swipe up or down to scroll through the list of transactions. Further, the user may tap on one of the transactions to view details of the tapped transaction. For example, if the user taps the transaction for Jamba Juice in screen 1202, the wearable device 102 may display screen 1205 including details of the transaction at Jamba Juice. The user also may swipe right of left on screen 1205 to go to the next detail transaction on the list.

Screen 1203 displays a list of offers from nearby merchants. The user may swipe up or down to scroll through the list of offers. The user may tap on one of the offers for a detail view of the tapped offer. For example, if the user taps the $2 off offer at Farmer's Market on screen 1203, screen 1206 may be displayed to show details of the offer from Farmer's Market. In particular, a button may be provided at screen 1206 to allow the user to save or accept the offer. As such, the offer may be applied toward the user's current or future purchase at the Farmer's Market.

Screen 1204 displays a list of shops or merchants near the user. The user may swipe up or down to scroll through the list of shops or merchants. The user may tap one of the shops of merchants to implement payment transactions at the tapped store or merchant. For example, if the user taps Farmer's Market at screen 1204, screen 1207 may be displayed to allow the user to make payments at Farmer's Market. In particular, screen 1207 may indicate that a $2 off coupon previously saved by the user is automatically applied to the purchase. If the user taps the pay button on screen 1207, a QR code or a bar code may be displayed to be scanned by the merchant to process or confirm payment. After the payment transaction, a screen may be displayed to confirm that the payment transaction has been processed successfully.

Accordingly, various information related to shopping, payments, offers, and the like, may be communicated from the user device 110 to the wearable device 102 to be displayed to the user 105. A navigation interface may be provided to allow the user 105 to navigate various information at the wearable device 102. Various user instructions also may be received at the wearable device 102 and communicated to the user device 110 for making transactions.

Figure 4:
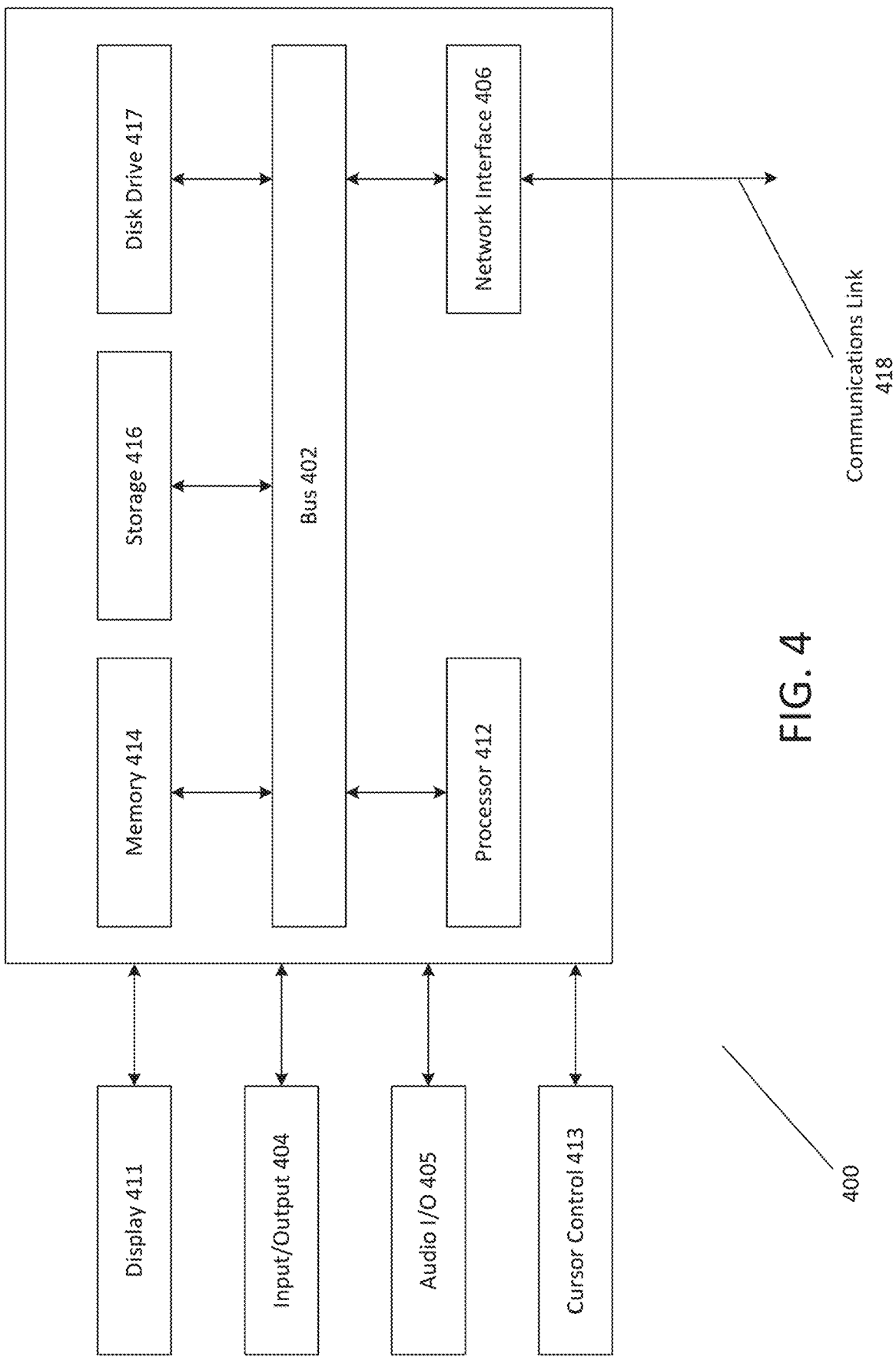
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable computing device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
   detecting, via a software application running on a computing device of a user, that a wearable device is communicatively coupled with the computing device via a short range wireless communication protocol, wherein the software application is associated with a payment service provider and is configured to enable the user to access a set of electronic transaction functionalities associated with a payment account with the payment service provider via the computing device based on one or more authentication credentials received from the computing device that authenticate the user;
   determining, for the wearable device, a subset of account activities available for the payment account based on a risk level for the subset of account activities, wherein the subset of account activities comprise the set of electronic transaction functionalities, and wherein the subset of account activities enable a voice control for processing transactions using the set of electronic transaction functionalities;
   in response to the detecting, establishing a session that links the wearable device with the computing device to enable the wearable device to access the set of electronic transaction functionalities associated with the payment account based on the one or more authentication credentials received from the computing device without requiring any user input via the computing device, wherein the session is associated with an expiration time upon which the wearable device is no longer linked with the computing device and the set of electronic transaction functionalities associated with the payment account is no longer accessible by the wearable device;
   receiving, via the voice control from a voice command to the wearable device, a request directly from the wearable device for performing a first electronic transaction corresponding to one of the set of electronic transaction functionalities using the payment account;

determining a confidence level that the user provided the voice command to the wearable device;

in response to determining that the user provided the voice command based on the confidence level, determining that the request is received prior to the expiration time;

in response to determining that the request is received prior to the expiration time and without requiring any user input via the computing device, processing the first electronic transaction using the payment account based on the one or more authentication credentials received from the computing device;

obtaining biometric sensor data directly from the wearable device collected by one or more sensors of the wearable device, wherein the obtained biometric sensor data is different from the one or more authentication credentials;

determining that the obtained biometric sensor data matches previously observed biometric sensor data associated with the user;

in response to determining that the obtained biometric sensor data matches the previously observed biometric sensor data, automatically extending the session that links the wearable device with the computing device to enable the wearable device to access the set of electronic transaction functionalities associated with the payment account beyond the expiration time based on the one or more authentication credentials received from the computing device; and in response to processing the first electronic transaction, transmitting a notification indicating the processing of the first electronic transaction to the wearable device.

2. The system of claim 1, wherein the wearable device is communicatively coupled with the computing device via Bluetooth low energy communication.

3. The system of claim 1, wherein the operations further comprise transmitting the notification to the computing device.

4. The system of claim 1, wherein the operations further comprise:
generating a notification indicating that the session is expiring within a predetermined period of time; and
pushing the notification to the wearable device.

5. The system of claim 4,
wherein the notification comprises a selectable option to extend the session beyond the expiration time; and
wherein the session is extended for an additional length of time when the selectable option is selected by the user.

6. The system of claim 1, wherein the operations further comprise:
detecting a signal wirelessly received by the wearable device from a beacon of a merchant location associated with the payment account of the user; and
in response to detecting the signal, (i) automatically checking-in the user to the merchant location and (ii) causing the wearable device to provide an alert indicating that the user is checked in at the merchant location.

7. The system of claim 1, wherein the biometric sensor data comprises at least one of voice data or location data.

8. A computer-implemented method comprising:
detecting, by a server machine via a software application running on a computing device of a user, that a first wearable device is communicatively coupled with the computing device via a short range wireless communication protocol, wherein the software application is associated with a payment service provider and is configured to enable the user to access a set of payment functionalities associated with a payment account with the payment service provider via the computing device based on one or more credentials received from the computing device;

determining, for the first wearable device, a subset of account activities available for the payment account based on a risk level for the subset of account activities, wherein the subset of account activities comprise the set of payment functionalities, and wherein the subset of account activities enable a voice control for processing transactions using the set of payment functionalities;

in response to the detecting, establishing, by the server machine, a session that links the first wearable device with the computing device to enable the first wearable device to access the set of payment functionalities associated with the payment account based on the one or more credentials received from the computing device without requiring any user input via the computing device, wherein the session is associated with an expiration time upon which the first wearable device is no longer linked with the computing device and the set of payment functionalities associated with the payment account is no longer accessible by the first wearable device;

receiving, by the server machine via the voice control from a voice command to the first wearable device, a request directly from the first wearable device for performing a payment transaction associated with a first one of the set of payment functionalities using the payment account;

determining a confidence level that the user provided the voice command to the first wearable device;

in response to determining that the user provided the voice command based on the confidence level, determining, by the server machine, that the request is received prior to the expiration time;

in response to determining that the request is received prior to the expiration time, processing, by the server machine, the payment transaction using the payment account based on the one or more credentials received from the computing device;

obtaining, by the server machine, biometric sensor data directly from the first wearable device collected by one or more sensors of the first wearable device, wherein the obtained biometric sensor data is different from the one or more credentials;

determining, by the server machine, that the obtained biometric sensor data matches previously observed biometric sensor data associated with the user;

in response to determining that the obtained biometric sensor data matches the previously observed biometric sensor data and without requiring any user input via the computing device, automatically extending, by the server machine, the session that links the first wearable device with the computing device to enable the first wearable device to access the set of payment functionalities associated with the payment account beyond the expiration time based on the one or more credentials received from the computing device; and in response to processing the payment transaction, transmitting, by the server machine, a notification indicating the processing of the payment transaction to the first wearable device.

9. The computer-implemented method of claim 8, further comprising generating the notification based on a specification of the first wearable device.

10. The computer-implemented method of claim 9, further comprising generating a second notification indicating the processing of the payment transaction to be displayed at a second wearable device connected to the computing device wirelessly based on a second specification associated with the second wearable device.

11. The computer-implemented method of claim 8, further comprising:
receiving a second voice command from the user via the first wearable device during the extended session; and
translating the second voice command into a second request for performing a second payment transaction corresponding to a second one of the set of payment functionalities using the payment account of the user based on the one or more credentials received from the computing device.

12. The computer-implemented method of claim 11, further comprising further extending the extended session in response to receiving the second voice command.

13. The computer-implemented method of claim 8, further comprising:
receiving a scanned code from the first wearable device;
determining a product based on the scanned code; and
providing, at the first wearable device, a price comparison for the determined product.

14. The computer-implemented method of claim 8, further comprising:
subsequent to extending the session, receiving biometric information from the first wearable device; and
in response to receiving the biometric information, further extending, automatically by the server machine, the extended session for an additional period of time, at least in part, based on the biometric information.

15. The computer-implemented method of claim 14, wherein the biometric information comprises at least one of a heart rate, a voice pattern, a speech pattern, a fingerprint, or a touch pattern.

16. The computer-implemented method of claim 8, wherein the request comprises a code scanned by the first wearable device.

17. A non-transitory machine-readable medium having stored thereon machine-readable instructions executable to cause a machine to perform operations comprising:
detecting, via a software application running on a computing device of a user, that a wearable device is communicatively coupled with the computing device via a short range wireless communication protocol, wherein the software application is associated with a payment service provider and is configured to enable the user to access a set of functionalities associated with a payment account with the payment service provider via the computing device based on one or more authentication credentials received from the computing device that authenticate the user;
determining, for the wearable device, a subset of account activities available for the payment account based on a risk level for the subset of account activities, wherein the subset of account activities comprise the set of payment functionalities, and wherein the subset of account activities enable a voice control for processing transactions using the set of payment functionalities;
in response to the detecting, establishing a session that links the wearable device with the computing device to enable the wearable device to access the set of functionalities associated with the payment account based on the one or more authentication credentials of the user received from the computing device without requiring any user input via the computing device, and wherein the session is associated with an expiration time upon which the set of functionalities associated with the payment account is no longer accessible by the wearable device;
receiving, via the voice control from a voice command to the wearable device, a request from the wearable device for performing an electronic transaction corresponding to a first one of the set of functionalities using the payment account;
determining a confidence level that the user provided the voice command to the wearable device;
in response to determining that the user provided the voice command based on the confidence level, determining that the request is received prior to the expiration time;
in response to determining that the request is received prior to the expiration time and without requiring any user input via the computing device, processing the electronic transaction using the payment account based on the one or more authentication credentials received from the computing device;
obtaining biometric sensor data directly from the wearable device collected by one or more sensors of the wearable device, wherein the obtained biometric sensor data is different from the one or more authentication credentials;
determining that the obtained biometric sensor data matches previously observed biometric sensor data associated with the user during a past authenticated user session;
in response to determining that the obtained biometric sensor data matches the previously observed biometric sensor data, automatically extending the session that links the wearable device with the computing device to enable the wearable device to access the set of functionalities associated with the payment account beyond the expiration time based on the one or more authentication credentials received from the computing device; and
in response to processing the electronic transaction, transmitting a notification indicating the processing of the electronic transaction to the wearable device.

18. The non-transitory machine-readable medium of claim 17, wherein the electronic transaction comprises a payment transaction.

19. The non-transitory machine-readable medium of claim 17, wherein the request is initiated based on the user navigating an electronic content displayed in a browser application running on the wearable device.

20. The non-transitory machine-readable medium of claim 17, wherein the operations further comprise providing, on a display of the wearable device, a user interface for accessing the set of functionalities associated with the payment account.

* * * * *